United States Patent
Ygnace et al.

(10) Patent No.: US 11,525,885 B2
(45) Date of Patent: Dec. 13, 2022

(54) PROCESSING RADAR SIGNALS

(71) Applicant: Infineon Technologies AG, Neubiberg (DE)

(72) Inventors: Romain Ygnace, Brunnthal (DE); David Addison, Bristol (GB); Markus Bichl, Feldkirchen-Westerham (DE); Dian Tresna Nugraha, Munich (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 408 days.

(21) Appl. No.: 16/402,268

(22) Filed: May 3, 2019

(65) Prior Publication Data

US 2019/0339360 A1 Nov. 7, 2019

(30) Foreign Application Priority Data

May 3, 2018 (DE) .................. 102018110626.2

(51) Int. Cl.
*G01S 7/35* (2006.01)

(52) U.S. Cl.
CPC .............. *G01S 7/354* (2013.01); *G01S 7/356* (2021.05)

(58) Field of Classification Search
CPC .................................. G01S 7/354; G01S 7/356
See application file for complete search history.

(56) References Cited

U.S. PATENT DOCUMENTS

| | | | | |
|---|---|---|---|---|
| 5,083,204 A * | 1/1992 | Heard | .................. | H04N 5/3655 |
| | | | | 348/164 |
| 5,471,592 A | 11/1995 | Gove | | |
| 2005/0285773 A1 * | 12/2005 | Hartzstein | ............ | H01Q 1/3233 |
| | | | | 342/107 |
| 2012/0134399 A1 * | 5/2012 | Gandhi | .................. | H03G 7/007 |
| | | | | 375/224 |
| 2016/0282458 A1 | 9/2016 | Nugraha | | |
| 2017/0097416 A1 * | 4/2017 | Shiraki | .................. | G01S 15/89 |
| 2017/0139036 A1 | 5/2017 | Nayyar | | |
| 2018/0045810 A1 | 2/2018 | Ygnace | | |

FOREIGN PATENT DOCUMENTS

| | | | |
|---|---|---|---|
| JP | H3020226 A | | 1/1991 |
| JP | 2008232936 A | | 10/2008 |
| JP | 2008256626 A | | 10/2008 |
| JP | 2009020781 A | * | 1/2009 |
| JP | 2011242232 A | | 12/2011 |

* cited by examiner

*Primary Examiner* — Timothy A Brainard

(74) *Attorney, Agent, or Firm* — Eschweiler & Potashnik, LLC (57) ABSTRACT

A radar device is disclosed that includes an input DMA module, at least one processing module, a histogram module, and an output DMA module. The input DMA module is configured to access a memory and supply data from the memory to the at least one processing module and/or to the histogram module. Each of the processing modules is configured to be enabled or disabled, wherein the at least one processing module that is enabled is configured to process at least a portion of the data supplied by the input DMA module, wherein the histogram module is fed by data from the at least processing module that is enabled and/or by the input DMA module. The output DMA module is configured to store the data that are processed by the at least one processing module that is enabled in the memory. Also, an according method is provided.

17 Claims, 5 Drawing Sheets

PROCESSING RADAR SIGNALS

REFERENCE TO RELATED APPLICATIONS

This application claims priority to DE 10 2018 110 626.2 filed on May 3, 2018, the contents of which are incorporated by reference in their entirety.

FIELD

The disclosure is directed to a radar device and a method of processing radar signals in a radar device.

BACKGROUND

Noise figure is an important performance parameter in many radio frequency (RF) systems. A low noise figure provides an improved signal/noise ratio for analog receivers and reduces the bit error rate in digital receivers. A receiver having a low noise figure can perform at the same performance level with smaller antennas or lower transmitter power than a receiver with a higher noise figure.

SUMMARY

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, and the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across a frequency range. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, and at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate, which is hereby incorporated by reference.

CFAR may be used as one approach to select FFT peaks, e.g., by comparing such peaks with predefined thresholds.

The present disclosure efficiently processes signals in a radar system that may eventually lead to an improved target recognition.

The examples suggested herein may in particular be based on at least one of the following solutions. In particular combinations of the following features could be utilized in order to reach a desired result. The features of the method could be combined with any feature(s) of the device, apparatus or system or vice versa.

The disclosure relates to a radar device comprising an input DMA module, at least one processing module, a histogram module, an output DMA module. The input DMA module is configured to access a memory and supply data from the memory to the at least one processing module and/or to the histogram module. Each of the processing modules is configured to be enabled or disabled, wherein the at least one processing module that is enabled is configured to process at least a portion of the data supplied by the input DMA module. The histogram module is fed by data from the at least processing module that is enabled and/or by the input DMA module, and the output DMA module is configured to store the data that are processed by the at least one processing module that is enabled in the memory.

This radar device is also referred to as HW (hardware) structure.

Operands for the active processing modules can be obtained via the input DMA module and the output DMA module.

Hence, the radar device suggested herein allows using configurable hardware in a flexible way.

Each module represents a functionality as described herein. Each module may be realized as a separate piece of hardware and/or software or at least two modules may be combined as a piece of hardware and/or software. It is also an option that a group of modules is combined with another hardware and/or software. For example, a hardware structure may comprise two different DMA functionalities, i.e. the input DMA module and the output DMA module. These functionalities may in particular be part of a single physical DMA hardware. Functionalities described herein may be implemented as different portions of hardware or they may share the same circuitry or chip.

According to an embodiment, the at least one processing module comprises an FFT module providing an FFT operation or an inverse FFT operation.

Hence, complex signal manipulation may be achieved by using the FFT module so that the radar device can be used for high performance interference detection and mitigation purposes.

According to an embodiment, the FFT module processes data using the histogram module.

The FFT module may in one embodiment compute a first stage FFT, a second stage FFT or a third stage FFT based on the data accessed by the input DMA module.

According to an embodiment the histogram module is part of the processing module.

The histogram module may in particular be part of an FFT module.

According to an embodiment, the histogram module comprises a histogram memory for storing histogram data.

According to an embodiment, the histogram module stores histogram data for a predetermined number of samples that are based on the received signal, wherein the predetermined number of samples are based on a chirp, a ramp of the received signal or any portion of the radar data cube.

According to an embodiment, the histogram data are used for at least one of the following: configuring a gain of a power amplifier of the radar device, and determining an inconsistency between data received by different antennas.

According to an embodiment, the input DMA module, the at least one processing module and the output DMA module are configurable by a sequencer.

According to an embodiment, the histogram module is configurable by the sequencer.

The at least one processing module and/or the histogram module may be enabled and/or disabled by the sequencer. Each of the at least one processing module and/or the histogram module may comprise a register that is configurable by the sequencer.

The sequencer may be configured to obtain at least one configuration list from a processing unit or from a memory, wherein the at least one configuration list contains configuration data for configuring the input DMA module, the at least one processing module, the histogram module and the output DMA module.

The sequencer may utilize the configuration list to configure the modules of the HW structure for a given computation stage and use a subsequent configuration for a subsequent computation stage (using the same HW structure) until the configuration of the configuration list is processed.

Hence, the circular processing provided by the radar device, which at each processing stage may be configured differently pursuant to the entries of the configuration list, is an efficient operation-based approach, executing one computation stage after another, thereby using the memory as an intermediate storage. Advantageously, no tool chain to generate program code (assembler, linker, compiler) is required, as the modules of the HW structure can be flexibly configured to execute predefined operations.

This approach thus allows conducting of complex operations on at least one set of radar data (e.g., a vector). The vector may correspond, e.g., to a bin of a ramp of data samples, in particular to analog-to-digital converted samples or results of FFT processing.

The output DMA module may be configured to write data in a native format to the memory. It is in one embodiment an option that the output DMA module uses the native format of an ECC (Error Correction Code). This is beneficial for the overall performance with regard to read/modify/write operations. The native format can be achieved by using a FIFO buffer that is filled until the full bus-width of an operation is reached. Hence, the operation predominately conducts full read/modify/write accesses instead of using, e.g., a read-operation directed to 32 bits for obtaining only 3 bits.

It is an option to concurrently generate multiple types of results by having multiple output DMA units with independent FIFO buffers.

The output DMA module may be configured to write to different regions of the memory. For example, the output DMA module may comprise several DMA engines to write data to different regions of the memory.

According to an embodiment, each of the at least one processing modules is arranged in series between the input DMA module and the output DMA module.

According to an embodiment, each of the at least one processing modules provides at least one of the following operations: a CFAR computation, at least one FFT computation, at least one iFFT computation, a windowing operation, an arithmetic operation, e.g., adding, subtracting, multiplying, etc., a comparison operation, a (selective) zeroing operation, an angular computation, in particular computing an angle and/or an elevation information, a peak computation, a coherent integration, a non-coherent integration, an interference mitigation computation, computing a range information, computing a Doppler information, and computing an energy information.

Also, a method is disclosed for processing data by a radar device, wherein the radar device comprises an input DMA module, at least one processing module, a histogram module, an output DMA module. The method comprises accessing via the input DMA module a memory and supplying data from the memory to the at least one processing module and/or to the histogram module, and enabling or disabling each of the processing modules. The method further comprises processing at least a portion of the data supplied by the input DMA module by the at least one processing module that is enabled, and processing by the histogram module of at least a portion of the data supplied by the input DMA module or supplied by an enabled processing module. In addition, the method comprises storing via the output DMA module the data in the memory, which data are processed by the at least one processing module that is enabled.

Further, a non-transitory computer program product is provided, which is directly loadable into a memory of a digital processing device, comprising software code portions for performing the acts of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

In known radar processing devices, a signal is acquired in the time domain. This signal may be acquired via a single antenna or across several antennas. The acquired signal is then converted into the frequency domain.

Figure 4:
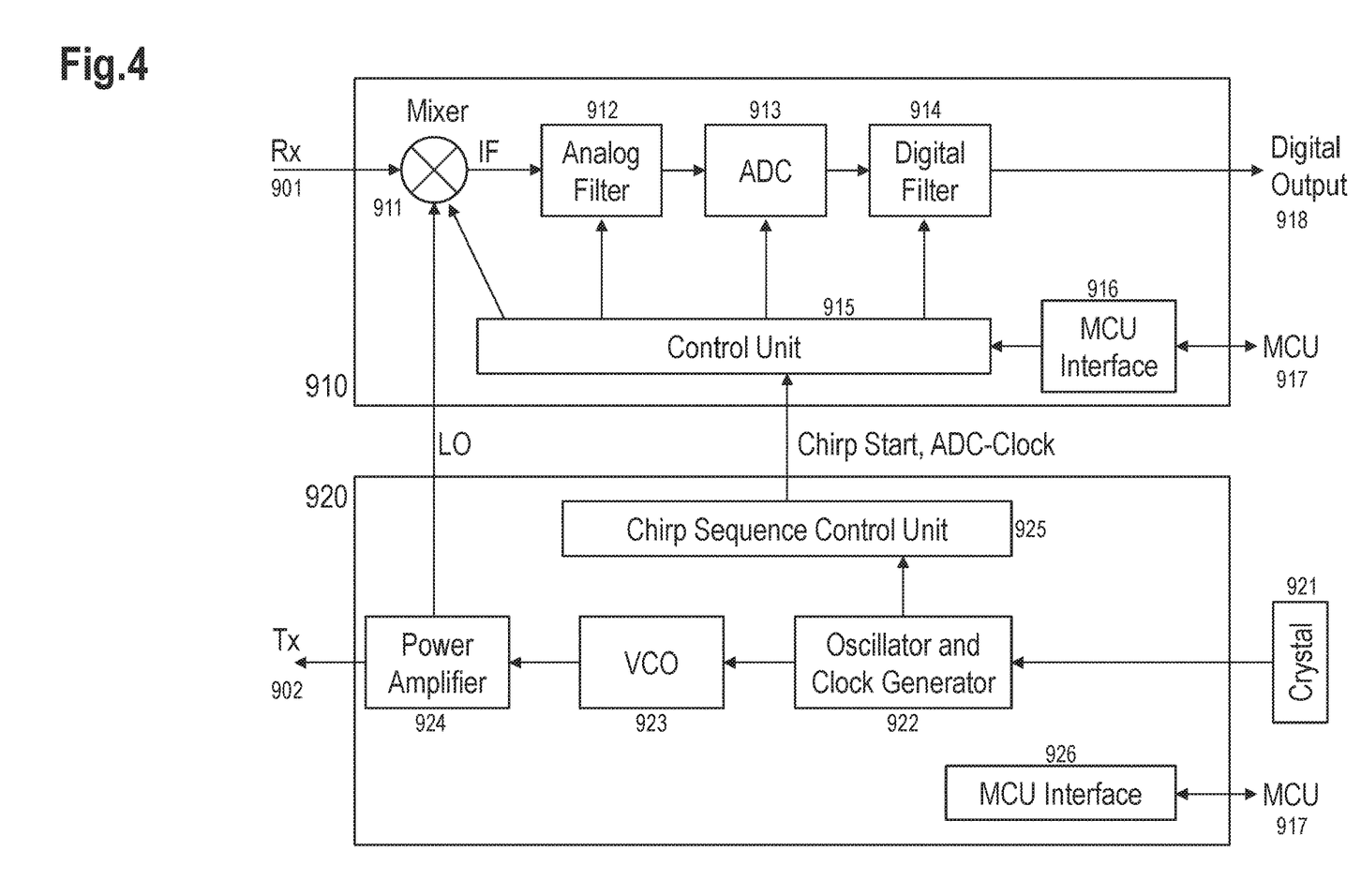
FIG. 4 shows a schematic structure of a transmitter and a receiver of a radar system.

FIG. 4 shows a schematic structure of a transmitter 920 and a receiver 910 of a radar system.

The receiver 910 comprises a mixer 911, an analog filter 912, an analog-to-digital converter (ADC) 913, a digital filter 914, a control unit 915 and an MCU interface 916 (MCU: microcontroller control unit).

A received signal RX 901 is (via an antenna, not shown) fed to the mixer 911. The mixer 911 is also supplied with a local oscillator signal LO (from the transmitter 920). At its output, the mixer 911 supplies an intermediate frequency signal IF to the analog filter 912 by down-mixing RX signal 901 using the LO signal. The output of the analog filter 912 is connected to the input of the ADC 913 and the output of the ADC 913 is connected to the input of the digital filter 914. Hence, the intermediate frequency signal IF is filtered by the analog filter 912, then the filtered analog signal is converted into a digital signal by the ADC 913 and the digitally filtered signal is supplied as a digital output 918 for further processing.

An MCU 917 supplies a signal to the MCU interface 916, which further conveys this signal to the control unit 915. The control unit 915 is configured to control or configure any of the following components: mixer 911, analog filter 912, ADC 913 and digital filter 914. The control unit 915 obtains a "chirp start" (indicating the start or any shift of the start of the chirp) signal and an "ADC-clock" signal (i.e. the clock signal for the ADC 913) from the transmitter 920.

In the example shown in FIG. 4, the transmitter 920 comprises an oscillator and clock generator 922, a voltage-controlled-oscillator (VCO) 923, a power amplifier 924, a chirp sequence control unit 925 and an MCU interface 926.

A crystal 921 (which in this example is located externally to the transmitter 920 but may also be part of the transmitter 920) is used by the oscillator and clock generator 922 to generate any clock signals required. For example, the oscillator and clock generator 922 supplies timing and clock signals to the chirp sequence control unit 925, which, based on these signals, determines the "chirp start" signal and the "ADC-clock" signal and conveys them toward the control unit 915 of the receiver 910.

Also, the oscillator and clock generator 922 feeds the oscillator signal to the VCO 923. The VCO 923 is used to drive the power amplifier 924, thereby generating the transmitted signal TX 902 (which is then conveyed via an antenna, which is not shown in FIG. 4). Also, the power amplifier 924 supplies the LO signal to the mixer 911 of the receiver 910.

Hence, according to the FMCW radar principle, the instantaneous transmit signal Tx 902 is multiplied/mixed with the received signal Rx 901. The analog filter 912 may be a lowpass filter (LPF) to remove unwanted frequencies originating from the mixing process. The IF signal contains information about the distance to the surrounding objects of the radar. Each object reflection yields a sinusoidal signal having a frequency that is proportional to the object distance.

The IF signals may be analyzed across several ramps. The corresponding raw data (samples from the ADC 913) may be stored in a memory. For further analysis of the raw data, a fast Fourier transform (FFT) can be used. A first FFT (the so-called range FFT) is used to determine the contained frequencies in the radar IF signals, one for each of the recorded ramps. A second FFT then yields the range Doppler map, which contains information about the velocity and the distance to surrounding objects.

Figure 5:
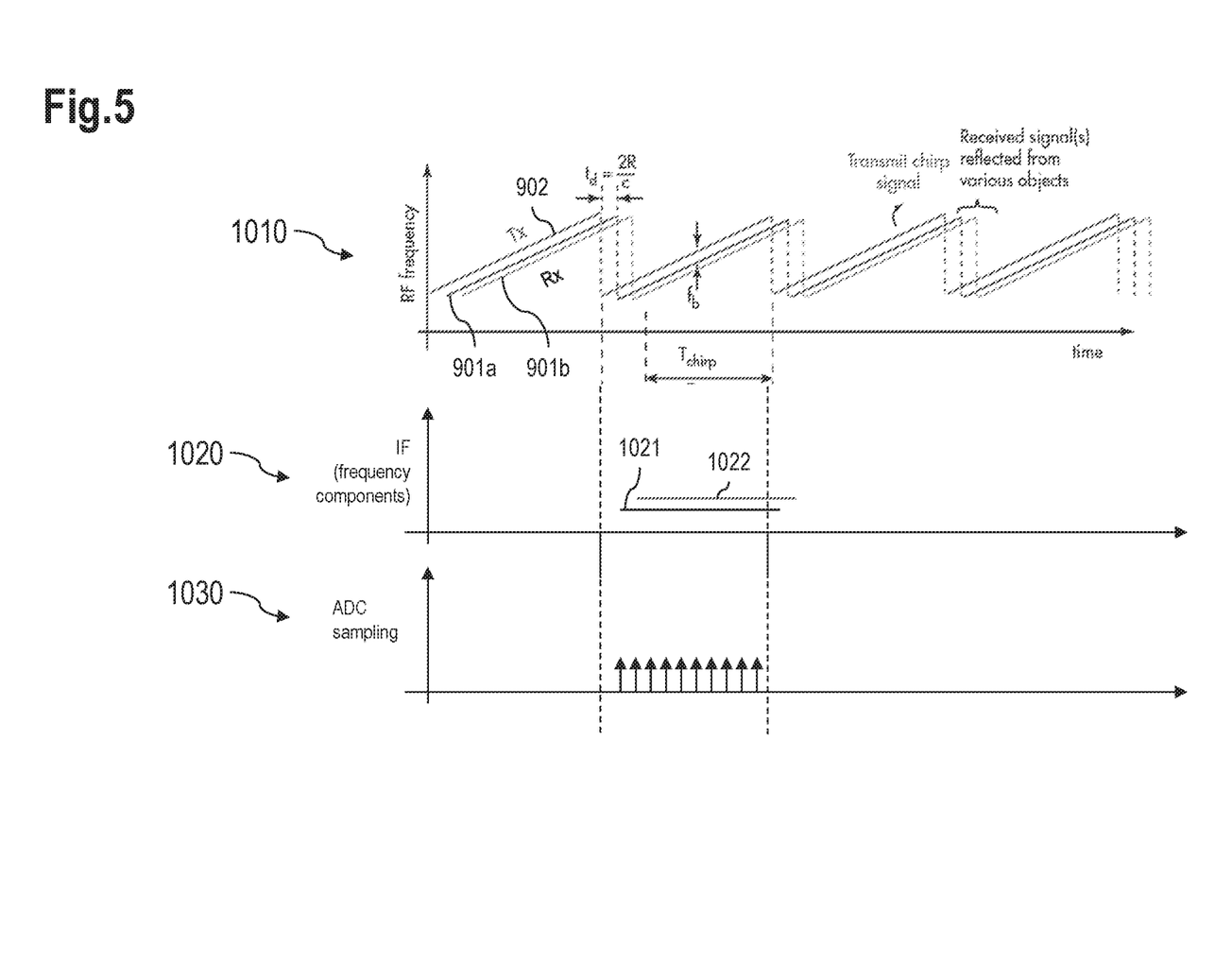
FIG. 5 shows an example diagram visualizing the transmitted and received signals as well as the sampling.

FIG. 5 shows an example diagram illustrating the transmitted and received signals as well as the sampling.

A diagram 1010 shows various radio-frequencies over time. The transmitted signal 902 is emitted. Due to reflections from various objects, several signals 901*a*, 901*b* are received. In this example, the reflections of received signals 901*a*, 901*b* are obtained as different received signals 901 as shown in FIG. 4. The transmitted signals 902 as well as the received signals 901*a*, 901*b* have the form of chirps, i.e. repetitive patterns of frequency-up-shifts.

A delay between the transmitted signal 902 and the received signal 901*a* amounts to $$t_d = \frac{2 \cdot R}{c},$$

wherein R is the range toward the object and c is the velocity of light.

Usually, a chirp starts after the received signal 901*b* has returned (optionally with some time offset). This is indicated by the chirp duration $T_{chirp}$ in FIG. 5.

A beat frequency $f_b$ indicates an intermediate frequency that is specific for a particular object or range.

A diagram 1020 shows frequency components of the intermediate frequency IF over time, wherein an IF 1021 is associated with the received signal 901*a* and an IF 1022 is associated with the received signal 901*b*.

A diagram 1030 shows ADC samples after sampling conducted by the ADC 913.

A physical chirp may in particular be based on an RF signal (RF: radio frequency) with a frequency up-shift or a frequency down-shift (also referred to as a ramp of frequencies). A "bin" may in particular be a result of an FFT processing of the samples of the chirp.

In the frequency domain, a histogram may be computed to determine, e.g., frequency band distributions or noise (e.g., a noise floor).

A histogram may comprise a predetermined number of segments, wherein each segment covers a predetermined range of a signal power. A sample (AD-converted value) may be counted for the segment that corresponds to the signal power of this sample. This may be done for a predetermined number of samples, which represents samples that are based, e.g., on a chirp or on any portion of a radar data cube.

A radar data cube provides an intuitive way to represent radar processing as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.mathworks.com/company/newsletters/articles/building-and-processing-a-radar-data-cube.html), which is hereby incorporated by reference.

After such computation, the histogram shows a distribution of signal power, i.e. the samples are visualized in view of their respective signal powers. Then, an adjustment of, e.g., a gain of an amplifier may be conducted based on this distribution shown by the histogram. If there are a certain number of samples below a lower threshold of the signal power, the gain may be increased; accordingly, the gain may be reduced if a predetermined number of samples are above an upper threshold of the signal power indicating a saturation.

The solution presented herein in particular facilitates compiling histograms in an efficient manner without a need for a significant amount of additional resources (e.g., memory bandwidth, processing power). Hence, the examples described herein allow reducing the computing effort required for compiling and/or utilizing histograms.

The histogram suggested herein comprises additional data based on a selection of samples. The selection may be based on a ramp, a chirp or any data, in particular a portion of the radar data cube.

The histogram may be computed on the fly. The histogram may hence provide at a regular basis values like a minimum, a maximum, an average, a standard deviation or the like of the signal power.

The histogram may be updated at predetermined time instants, regularly or irregularly.

The histogram may comprise a predetermined number of segments (also referred to as classes). The segments may cover the same ranges of signal power or they may cover at least partially different ranges of signal power. If a sample falls in one segment, i.e. the signal power of the sample falls within the range of the signal power of this segment, the count of this segment is incremented. After the selection of samples is processed, the histogram may be stored, or it may be reset for the next selection of samples.

An FFT module may be configured to process data stored in a memory; such data may comprise the samples obtained as digital output 918. It is noted that the digital output 918 may be stored in a memory and it may be retrieved from the memory via a DMA (direct memory access) mechanism for further processing, e.g., via the FFT module.

Examples described herein in particular suggest extending such FFT module with a histogram unit or circuit.

This extension may refer to a functional extension without the requirement of the histogram unit being physically located together with the FFT module or to a physical extension, wherein both the histogram unit and the FFT module are each implemented as a single device or in an arrangement comprising several devices.

This efficiently allows reducing the memory bandwidth and/or computing the FFT results and the histogram data in parallel.

In an example embodiment, the FFT module comprises a computation unit, which may in particular conduct a signal power computation.

Figure 1:
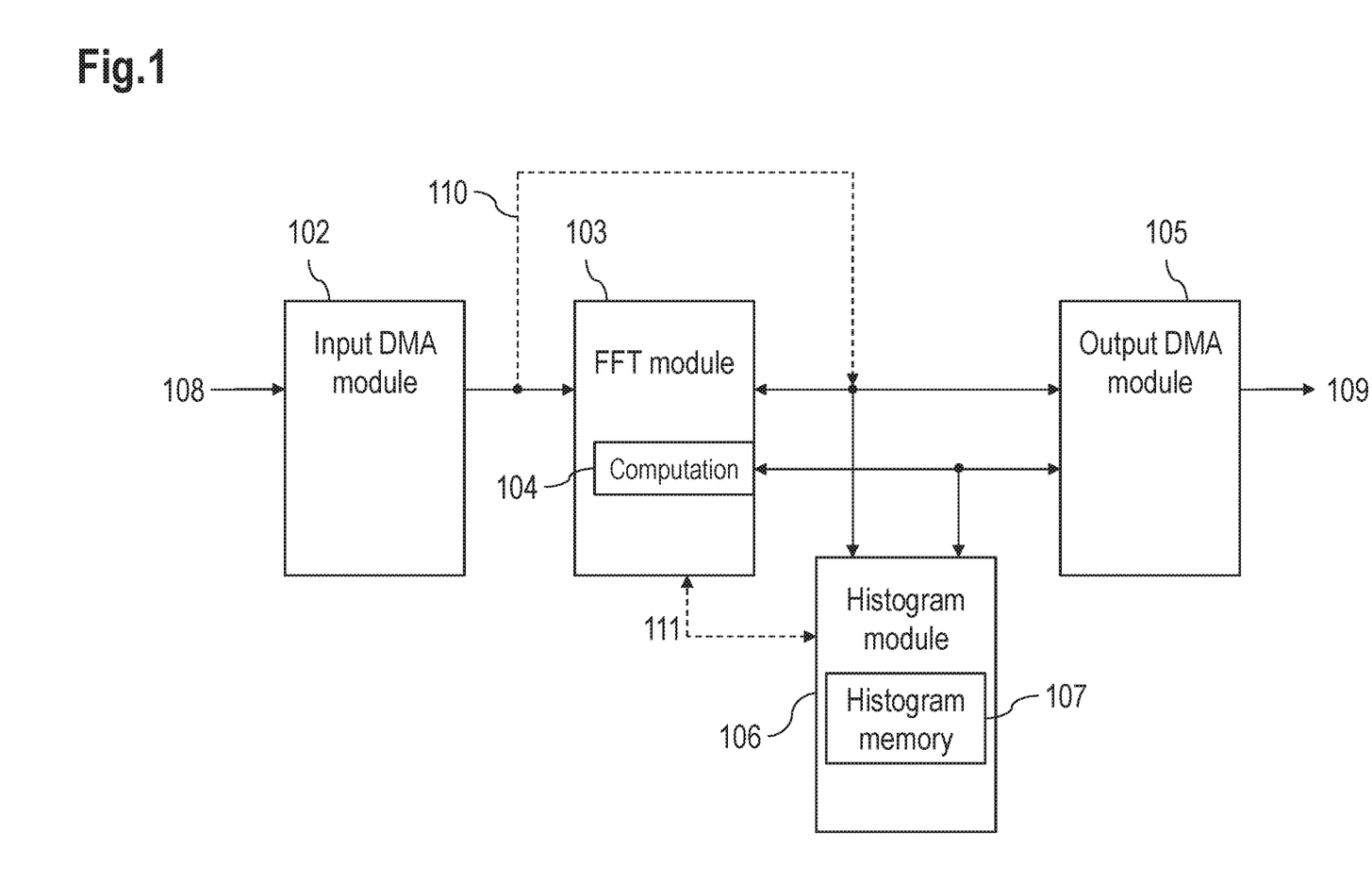
FIG. 1 shows an example embodiment of how to utilize a histogram module within a flexible processing chain of a radar system.

FIG. 1 shows an example embodiment of how to utilize a histogram module 106 or circuit.

An input DMA module or circuit 102 is configured to access data 108 stored in a memory via direct memory access (DMA). A subsequent FFT module or circuit 103 allows conducting a FFT (or an iFFT) operation. As an option, the FFT module 103 may comprise a computation unit or circuit 104. The FFT results of the FFT module 103 and/or the results of the computation unit 104 may be conveyed towards an output DMA module or circuit 105 and/or to the histogram module 106.

The histogram module 106 comprises a histogram memory 107 for storing data. A communication channel 111 between the histogram module 106 and the FFT module 103 may be provided to allow for the FFT module 103 to use data of the histogram module 106 (stored in the histogram memory 107).

The histogram module 106 may be separate from or closely attached to the FFT module 103 or it may be part of the FFT module 103 such that there is no separate communication channel necessary.

The output DMA module 105 allows writing results 109 to the memory via DMA.

Hence, the FFT module 103 (with or without the optional computation unit 104) may provide computation results to be further processed, e.g., stored, by the output DMA module 105.

It is another option that further modules are provided between the input DMA module 102 and the output DMA module 105 that may facilitate further operations on the data before storing them in the memory. Hence, the example arrangement of FIG. 1 can be used to access data of the memory, process it and store it at the same addresses or at different addresses of the same memory or of another memory. It is in particular an option to provide an operation on data of a radar data cube by applying this input-processing-output scheme outlined in FIG. 1.

It is an option that the computation unit 104 is supplied as a separate module in the chain between the input DMA module 102 and the output DMA module 105. The computation unit 104 may convey its computed results to the histogram module 106 and/or to the subsequent module of the chain (in the example shown in FIG. 1 this subsequent module of the chain is the output DMA module 105).

The computation unit 104 may be configured as a separate unit on its own, it may be part of the FFT module 103 or it may be part of the histogram module 106.

The computation unit 104 may process in one embodiment signal power information based on at least one of the following formats: a linear power; a log 2 power; a magnitude approximation; a phase; and any 16-bit, 32-bit or 64-bit (real or complex) value.

It is another option that the FFT module 103 is bypassed to convey any type of data (e.g., from the memory) directly to the histogram module 106 and/or to any subsequent module of the processing chain (in the example of FIG. 1 this subsequent module is the output DMA module 105). This is indicated by a dashed arrow 110.

Figure 2:
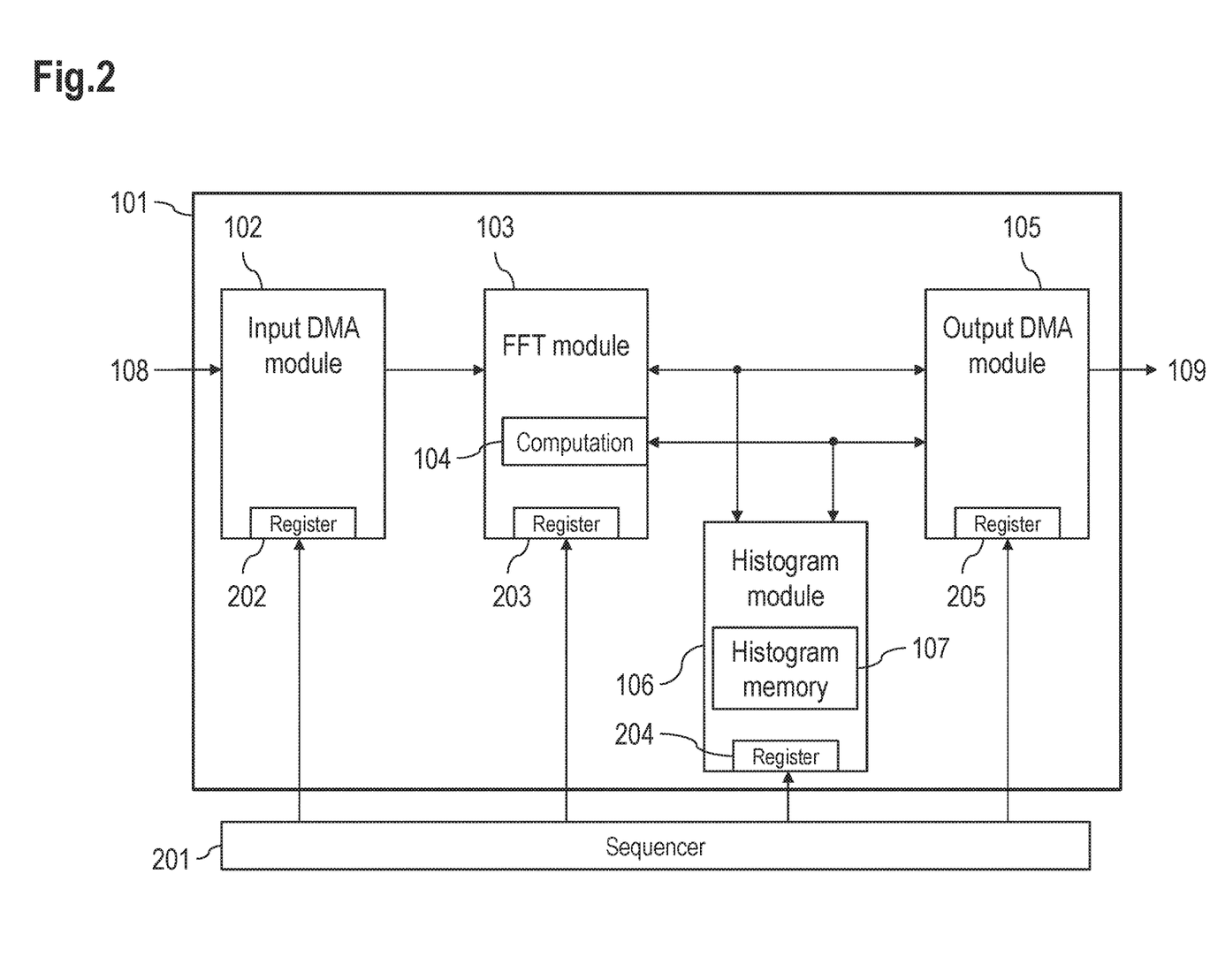
FIG. 2 shows an example of a hardware (HW) structure comprising the elements shown in FIG. 1.

FIG. 2 shows an example of a hardware (HW) structure 101 comprising the elements shown in FIG. 1. In addition to FIG. 1, a sequencer circuit 201 is supplied which allows configuring each of the modules 102, 103, 106 and 105 via registers 202, 203, 204 and 205, respectively.

Solutions described herein in particular enable the HW structure 101 to perform operations directed to interference detection and mitigation. Such operations may be configurable, e.g., by a user, and hence be adjusted to a predefined use-case scenario.

The sequencer 201 allows enabling or disabling of at least a portion of the respective module. If one module is disabled, this may correspond to the module being effectively bypassed (i.e. as if this module was not present in the chain from the input DMA module 102 towards the output DMA module 105).

As an option, the histogram function may be implemented in an UNLOADER unit or circuit at the output of the FFT module (not shown). The UNLOADER unit may be any piece of hardware that obtains the results of the FFT module 103 and passes these to at least one subsequent processing stage of the chain. In such a case, the UNLOADER unit may have two outputs: FFT results (i.e. bins), and at least one optional signal (e.g., a power information such as a signal power or the like).

The outputs of the UNLOADER unit may be provided to the histogram module 106 and/or to the output DMA module 105.

Hence, the input of the histogram module 106 is connected to at least one of the following: the output of the FFT module 103, the output of the input DMA module 102, and the output of the computation unit 104.

Hence, the histogram module 106 receives at least one of the following: FFT results from the FFT module 103, data from the memory via the input DMA module 102 (in this case the FFT module 103 is bypassed), and data from the computation unit 104. In case the computation unit 104 is a separate module in the chain (as described above), it may have a direct connection to the histogram module 106.

Histogram data is stored in the histogram memory 107 of the histogram module 106. This histogram memory 107 may be directly or indirectly accessible by a programmable computing resource to analyze the histogram data and subsequently control the configuration of the HW structure 101, which could be used for a subsequent processing stage. In other words, the HW structure 101 can use a first configuration performing a first processing stage and a second (e.g., different) configuration performing a second processing stage. Hence, the HW structure 101 can be configured in a flexible way to conduct steps of such first processing stage in a first pass and steps of the second processing stage in a second pass.

The histogram module 106 may in particular support any of the following formats: complex data, or 32-bit data of a linear signal power.

As an output, the histogram module may supply at least one of the following:

A histogram of $\log_2$ power of a size between $2^5$ (32) and $2^{12}$ (4096) output bins. A single histogram bin may in particular be incremented for each input data. The count is accumulated and retained until the bins are cleared, e.g., by overwriting it with 0.

The output may be a 64-bit word.

A "chirp" is a transmitted and with some delay received signal at the radar system. The chirp may comprise a frequency up shift or a frequency down shift (ramp of frequencies). A "bin" may in particular be a result of an FFT processing. An input to an FFT stage may be either real data sampled via an analog-to-digital converter (ADC) or FFT bins from a previous FFT stage (when multiple FFT processing stages are required).

The bin or chirp may in particular refer to or be associated with at least one sample, a frequency or a frequency range (e.g., a ramp of frequencies). It may be associated with a potential target (i.e. at least one potential target).

As an option, the histogram can be computed over all antennas, for a group of antennas or for a single antenna. The number of input FFT values used for the histogram module 106 may in particular be flexibly configurable.

Figure 3:
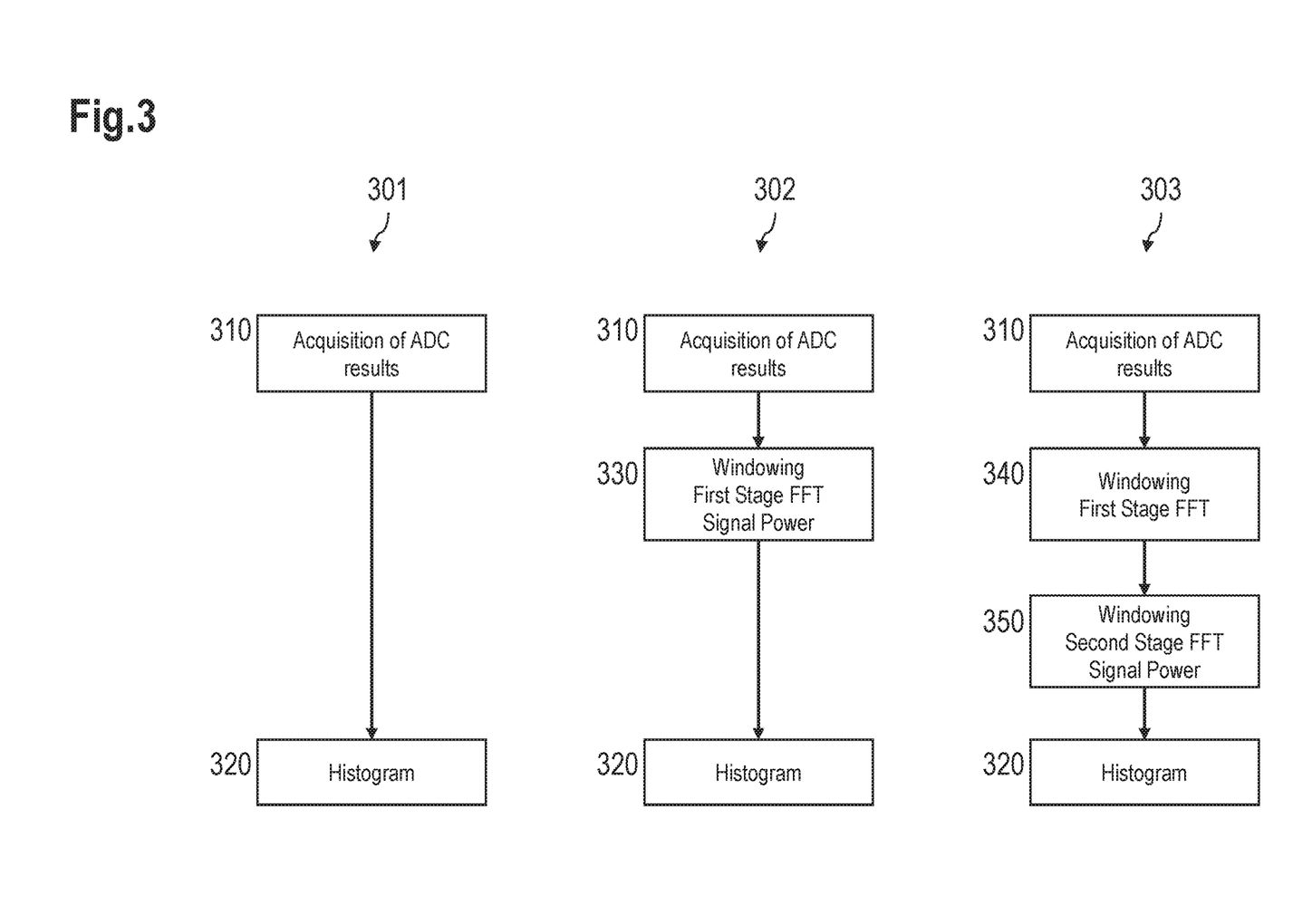
FIG. 3 shows example flow diagrams comprising options of acts to be performed utilizing the histogram module.

FIG. 3 shows example flow diagrams comprising options of acts to be performed utilizing the histogram module.

Scenario 301: Histogram Based on Samples

The HW structure 101 may be configured to conduct the steps shown in a scenario 301:

At 310, the received signal is processed and sampled (ADC results are also referred to as samples).

Subsequent to the act 310, the ADC results are stored as histogram data at 320. Each ADC result may comprise a signal power value which results in a segment of the histogram that covers this signal power value to be incremented.

The scenario 301 may in particular be useful for ADC offset cancellation purposes. The histogram data obtained should indicate an average value amounting to 0 in case the offset cancellation prior to act 310 was done correctly. If the average value is different from 0, a control may be used to shift the offset closer to 0 (or to 0 if possible).

This scenario 301 may in particular be used per antenna to monitor the ADC results per MMIC (monolithic microwave integrated circuit).

Scenario 302: Histogram Based on First Stage FFT Results

A scenario 302 also comprises the act 310. Subsequent to this act 310, an act 330 is conducted comprising a windowing (selection of the ADC results) and a first stage FFT. The FFT results are processed towards the histogram 320 according to their respective signal power.

This scenario 302 may be used for monitoring the gain in an analog front-end (i.e. the power amplifier 924 of the transmitter 920) of an MMIC. The histogram 320 is based on the signal power values of the first stage FFT results. Any peaks in the histogram data be determined and they can be compared with low and high thresholds. Ideally, the peaks may stay within a range determined by these low and high thresholds. Otherwise, the gain of the power amplifier 924 may be adjusted accordingly. The low threshold indicates that any data above this low threshold has sufficient signal power. The high threshold indicates a level of saturation, which may in particular be important for a subsequent second stage FFT.

Also, this scenario 302 may be used per antenna.

Scenario 303: Histogram Based on Second Stage FFT Results

A scenario 303 also comprises the act 310. Subsequent to this act 310 a subsequent act 340 is conducted comprising a windowing (selection of the ADC results) and a first stage FFT.

Subsequent to the act 340, an act 350 is conducted comprising a windowing (selection of the first stage FFT results) and a second stage FFT producing second stage FFT results. The second stage FFT results are processed towards the histogram 320 according to their respective signal power.

This scenario 303 may be used for monitoring the gain of the analog front-end of the MMIC as described with regard to scenario 302. As a difference to the scenario 302, the signal power of the second stage FFT results are used compared to the signal power of the first stage FFT results.

The scenario 303 may also be used to check consistencies of computations: If the radar system is properly calibrated, histogram data between different antennas should be similar, i.e. any difference between histogram data stays should remain within a predefined limit. Hence, if such difference exceeds the predefined limit, an inconsistency that may in particular be based on a faulty computation may have occurred.

Also, this scenario 303 may be used per antenna.

Further Advantages and Embodiments

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A radar device, comprising:
an input direct memory access (DMA) circuit,
a Fast Fourier Transform (FFT) circuit,
a histogram circuit configured to compile histogram data for a plurality of segments corresponding to respective signal power ranges, wherein the histogram data comprises a count associated with each segment, wherein the count for a segment corresponds to a number of data samples having a signal power within the signal power range for the segment, and
an output DMA circuit,
wherein the input DMA circuit is configured to access a memory and supply data samples from the memory to the FFT circuit and/or to the histogram circuit,
wherein each of the FFT circuit is configured to be enabled or disabled,
wherein, when enabled, the FFT circuit is configured to process at least a portion of the data samples supplied by the input DMA circuit,
wherein the histogram circuit is, in a first mode, fed by data samples from the FFT circuit and, in a second mode, fed by data samples from the input DMA circuit, and
wherein the output DMA circuit is configured to store the data samples that are processed by the FFT circuit in the memory.

2. The device according to claim 1, wherein the FFT circuit is configured to process data using the histogram circuit.

3. The device according to claim 1, wherein the histogram circuit comprises a histogram memory for storing histogram data.

4. The device according to claim 3, wherein the histogram circuit stores histogram data for a predetermined number of data samples, wherein the data samples are based on a received signal received by the radar device, and wherein the predetermined number of data samples are based on a chirp, a ramp of the received signal or any portion of a radar data cube.

5. The device according to claim 3, wherein the histogram data are used for determining an inconsistency between data received at the input DMA circuit by different antennas.

6. The device according to claim 1, wherein the input DMA circuit, the FFT circuit and the output DMA circuit are selectively configured by a sequencer.

7. The device according to claim 6, wherein the histogram circuit is selectively configured by the sequencer.

8. The device according to claim 1, further comprising at least one processing circuit configured to provide at least one of the following operations:
a CFAR computation,
a windowing operation,
an arithmetic operation comprising one or more of adding, subtracting, and multiplying,
a comparison operation,
a selective zeroing or zeroing operation,
an angular computation comprising computing an angle and/or an elevation information,
a peak computation,
a coherent integration,
a non-coherent integration,
an interference mitigation computation,
computing a range information,
computing a Doppler information, and
computing an energy information.

9. A method for processing data by a radar device, wherein the radar device comprises an input DMA circuit, a Fast Fourier Transform (FFT) circuit, a histogram circuit, and an output DMA circuit, the method comprising:
accessing via the input DMA circuit a memory;
in a first mode,
supplying data samples from the memory to the FFT circuit, processing at least a portion of the data samples supplied by the input DMA circuit by the FFT circuit, processing by the histogram circuit of at least a portion of the data samples processed by the FFT circuit, wherein the processing by the histogram circuit comprises compiling histogram data for a plurality of segments corresponding to respective signal power ranges, wherein the histogram data comprises a count associated with each segment, wherein the count for a segment corresponds to a number of data samples having a signal power within the signal power range for the segment, and in a second mode, supplying data samples from input DMA circuit to the histogram circuit; and storing via the output DMA circuit the data samples in the memory, which data samples are processed by the FFT circuit.

10. The method of claim 9, comprising:

processing data samples from the input DMA circuit with the histogram circuit, wherein the data samples are generated by an analog-to-digital converter (ADC);

determining an average signal power value based on the histogram data; and adjusting an offset cancellation process of the ADC based on the average signal power value.

11. The method of claim 9, comprising:

processing data samples from a first stage of the FFT circuit to generate output samples;

processing the output samples with the histogram circuit;

identifying peaks in the histogram data;

comparing the peaks to a threshold; and adjusting a gain of a power amplifier in an analog front end of the radar device based on the comparison.

12. The method of claim 9, comprising:

processing data samples associated with a first antenna received from a second stage of the FFT circuit with the histogram circuit;

processing data samples associated with a second antenna received from the second stage of the FFT circuit with the histogram circuit;

comparing histogram data for the data samples received from the first antenna with histogram data for the data samples received from the second antenna; and determining that a faulty computation has occurred when a difference between the histogram data for the data samples received from the first antenna and the histogram data for the data samples received from the second antenna exceeds a threshold.

13. The method according to claim 9, wherein the processing by the histogram circuit comprises compiling histogram data for a predetermined number of data samples, wherein the data samples are based on a received signal, and wherein the predetermined number of data samples are based on a chirp, a ramp of the received signal or any portion of a radar data cube.

14. A non-transitory computer-readable medium having computer-executable instructions stored thereon for processing data by a radar device, wherein the radar device comprises an input DMA circuit, a Fast Fourier Transform (FFT) circuit, a histogram circuit, and an output DMA circuit, the instructions configured to, when executed by the radar device, cause the radar device to perform corresponding functions comprising:

accessing via the input DMA circuit a memory and supplying data samples from the memory to the FFT circuit and/or to the histogram circuit, processing at least a portion of the data samples supplied by the input DMA circuit by a first stage of the FFT circuit and a second stage of the FFT circuit, processing by the histogram circuit of at least a portion of the data samples supplied by the second stage of the FFT circuit, wherein the processing by the histogram circuit comprises compiling histogram data for a plurality of segments corresponding to respective signal power ranges, wherein the histogram data comprises a count associated with each segment, wherein the count for a segment corresponds to a number of data samples having a signal power within the signal power range for the segment, and processing data samples associated with a first antenna received from the second stage of the FFT circuit with the histogram circuit;

processing data samples associated with a second antenna received from the second stage of the FFT circuit with the histogram circuit;

comparing histogram data for the data samples received from the first antenna with histogram data for the data samples received from the second antenna; and determining that a faulty computation has occurred when a difference between the histogram data for the data samples received from the first antenna and the histogram data for the data samples received from the second antenna exceeds a threshold; and storing via the output DMA circuit the data samples in the memory, which data samples are processed by the FFT circuit.

15. The non-transitory computer-readable medium of claim 14, wherein the instructions include instructions configured to cause the radar device to perform corresponding functions comprising:

processing data samples from the input DMA circuit with the histogram circuit, wherein the data samples are generated by an analog-to-digital converter (ADC);

determining an average signal power value based on the histogram data; and adjusting an offset cancellation process of the ADC based on the average signal power value.

16. The non-transitory computer-readable medium of claim 14, wherein the instructions include instructions configured to cause the radar device to perform corresponding functions comprising:

processing data samples from a first stage of the FFT circuit to generate output samples;

processing the output samples with the histogram circuit;

identifying peaks in the histogram data;

comparing the peaks to a threshold; and adjusting a gain of a power amplifier in an analog front end of the radar device based on the comparison.

17. The non-transitory computer-readable medium of claim 14, wherein the instructions include instructions configured to cause the radar device to perform corresponding functions comprising compiling histogram data for a predetermined number of data samples, wherein the data samples are based on a received signal, and wherein the predetermined number of data samples are based on a chirp, a ramp of the received signal or any portion of a radar data cube.

* * * * *